(12) United States Patent
Gaushell

(10) Patent No.: US 9,571,468 B2
(45) Date of Patent: Feb. 14, 2017

(54) ENCODING DATA USING A VARIABLE NUMBER OF PIXELS AND BITS BASED ON ENTROPY

(71) Applicant: Richard Dennis Gaushell, Sunnyvale, CA (US)

(72) Inventor: Richard Dennis Gaushell, Sunnyvale, CA (US)

(73) Assignee: WHOVOO, INC., Boston, MA (US)

( * ) Notice: Subject to any disclaimer, the term of this patent is extended or adjusted under 35 U.S.C. 154(b) by 215 days.

(21) Appl. No.: 14/589,333

(22) Filed: Jan. 5, 2015

(65) Prior Publication Data

US 2016/0359815 A1 Dec. 8, 2016

Related U.S. Application Data

(60) Provisional application No. 61/923,703, filed on Jan. 5, 2014.

(51) Int. Cl.
*H04L 9/00* (2006.01)
*H04L 29/06* (2006.01)
*H04L 9/32* (2006.01)

(52) U.S. Cl.
CPC ......... *H04L 63/0428* (2013.01); *H04L 9/3247* (2013.01); *H04L 63/062* (2013.01); *H04L 63/083* (2013.01); *H04L 2209/34* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,631,161 B1 * | 10/2003 | Kajiki | ................... | H04N 19/176 375/240.01 |
| 7,099,506 B2 * | 8/2006 | Mishima | ................. | G06T 9/005 358/1.9 |
| 8,554,001 B2 * | 10/2013 | Lee | ....................... | H04N 19/597 382/233 |
| 9,071,849 B2 * | 6/2015 | Yoon | ..................... | H04N 19/593 |
| 9,100,661 B2 * | 8/2015 | Alshina | ................. | H04N 19/61 |
| 9,210,427 B2 * | 12/2015 | Chono | ............. | H04N 19/00781 |
| 9,307,241 B2 * | 4/2016 | Yu | ........................ | H04N 19/577 |

\* cited by examiner

*Primary Examiner* — Beemnet Dada
(74) *Attorney, Agent, or Firm* — Morgan, Lewis & Bockius LLP

(57) ABSTRACT

Electronic information is encoded and transmitted by comparing values of adjacent pixels in an electronic image, determining an amount of entropy present in values of adjacent pixels, identifying a highest-order non-matching bit in the values of adjacent pixels, replacing bits of lower order than the highest-order non-matching bit with data, storing the image and replaced bits in a computer memory, and transmitting the image and replaced bits, via a computer network, to a recipient.

17 Claims, 12 Drawing Sheets

400

Figure 4A: Constant Pixel Skip Method

Figure 4B: Random Pixel Skip Method

Figure 4C: Random Pixel Skip Method combined with layer permutation

ENCODING DATA USING A VARIABLE NUMBER OF PIXELS AND BITS BASED ON ENTROPY

CROSS-REFERENCE TO RELATED APPLICATIONS

This application claims priority to and the benefit of U.S. Provisional Patent Application Ser. No. 61/923,703, filed on Jan. 5, 2014, which is hereby incorporated herein by reference in its entirety.

TECHNICAL FIELD

Embodiments of the present invention related generally to secure communications and, more particularly, to the sending and receiving of encoded information.

BACKGROUND

Encryption of data and steganography are well-known methods to protect sensitive data and hide information, respectively, in computer image files, audio files, video files, or other files. Encryption of sensitive information currently has a drawback, however, in that it is unusual enough to draw attention from those who would like to break the encryption. Furthermore, sending encrypted messages in a computer application typically involves first setting up keys for both the sender and the recipient, either through symmetric private keys or asymmetric public keys. These keys are used repeatedly for all or much of any communication, and they thus require careful selection, management and multiple steps to use them. A need therefore exists for a more secure means of communication.

SUMMARY

Embodiments of the present invention propose a unique method that secures data with any cipher, stores the encrypted data within low-order or least-significant bit ("LSB") fields of channels in various image formats, distributes the image data over unsecured networks, and decrypts the ciphertext using distributed remote keys. This combination provides a new level of protection for encrypted data, as it must first be discovered within a set of image files, then decoded from within the image, and finally decrypted. Encrypted secret data may be stored within the LSB fields of image pixels, in a way that both prevents detection by an outside observer, and also increases the storage capacity of the image, all without distorting the image to the unaided eye. Embodiments of the present invention include a method to introduce randomness into the encoding process, making discovery of encoded information difficult. The increased difficulty of detecting encrypted information gives several orders of magnitude more protection than encryption alone. In addition, the use of image file formats allows streamlined usage of existing digital photo distribution networks and applications, making it possible to send encrypted information without detection. This invention provides a method of improving the security of encrypted data sent through insecure networks, increasing the anonymity of the sender, and enabling increased control by the sender over who can view the decrypted data and when they can view it.

Further embodiments of the present invention include a system in which symmetric keys are generated randomly for each message, and transmitted over secure communication links to a central key server, where they are tied to a secure one-way hash signature of the encrypted data. The recipient may authenticate itself with the central server and provide the signature of the encrypted data, at which time the central server will provide the symmetric key to decrypt the data. In embodiments of the present invention, the sender and recipient use a session token to maintain authentication with the central server, and through a single action in an application, they can encrypt data or decrypt data.

Other embodiments of the present invention include using the natural entropy of the enclosing image to derive which pixels to use for encoding and the number of bits to modify in those pixels. By using the natural entropy of the image, this method allows encoding any number of bits within the bit field of the pixel's color value. This allows for increased amount of data storage in the same sized image over traditional 1 or 2 LSB encoding, while at the same time does not affect the visibility of the image as a photograph.

The increased difficulty of detecting encrypted data gives a large increase in protection over encryption alone. In addition, the use of an image file format allows streamlined usage of existing digital photo distribution networks and applications. This invention provides a method of improving the security of encrypted data sent through insecure networks, and enabling increased control by the sender over who can view the decrypted data and when they can view it.

In one embodiment, a method for encoding and transmitting electronic information includes comparing values, using a computer processor, of adjacent pixels in an electronic image, determining an amount of entropy present in values of adjacent pixels, identifying a highest-order non-matching bit in the values of adjacent pixels, replacing bits of lower order than the highest-order non-matching bit with data, storing the image and replaced bits in a computer memory, and transmitting the image and replaced bits, via a computer network, to a recipient.

The may further include receiving the image and replaced bits with a recipient system, identifying the highest-order non-matching bit in values of adjacent pixels, and extracting data from bits of lower order than the highest-order non-matching bit. The values of adjacent pixels may include red, green, blue, or alpha values. The amount of entropy may be compared to a threshold and replacing bits only if the amount of entropy is greater than a threshold. The data may be encrypted prior to replacing bits with the data. The amount of entropy may vary across multiple pixels and varying numbers of lower-order bits are replaced accordingly. A random key and/or decoding parameters may be transmitted to a recipient. The image and replaced bits may be transmitted via a remote server or transmitting the image and replaced bits directly to a recipient. Decoding or decryption keys may be decoded and transmit to a remote key-server system via a secure computer network.

In another aspect, a system for encoding and transmitting information includes a computer memory configured for storing an electronic image and a computer processor configured for executing computer instructions for comparing values of adjacent pixels in the image, determining an amount of entropy present in values of adjacent pixels, identifying a highest-order non-matching bit in the values of adjacent pixels, replacing bits of lower order than the highest-order non-matching bit with data, storing the image and replaced bits in a computer memory, and transmitting the image and replaced bits, via a computer network, to a recipient.

The system may further include a recipient system comprising a computer processor configured for executing computer instructions for receiving the image and replaced bits, identifying the highest-order non-matching bit in values of adjacent pixels, and extracting data from bits of lower order than the highest-order non-matching bit. A remote key-server system may be included for receiving, via a secure computer network, decoding or decryption keys and generated by the system. Non-volatile storage may be included for storing the computer instructions or image. The values of adjacent pixels may include red, green, blue, or alpha values. The computer processor may be further configured for executing computer instructions for encrypting the data prior to replacing bits with the data, for executing computer instructions for varying numbers of lower-order bits are replaced accordingly in accordance with the amount of entropy varies across multiple pixels, and/or for executing computer instructions for generating decoding or decryption keys and transmitting said keys to a remote key-server system via a secure computer network.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1A:
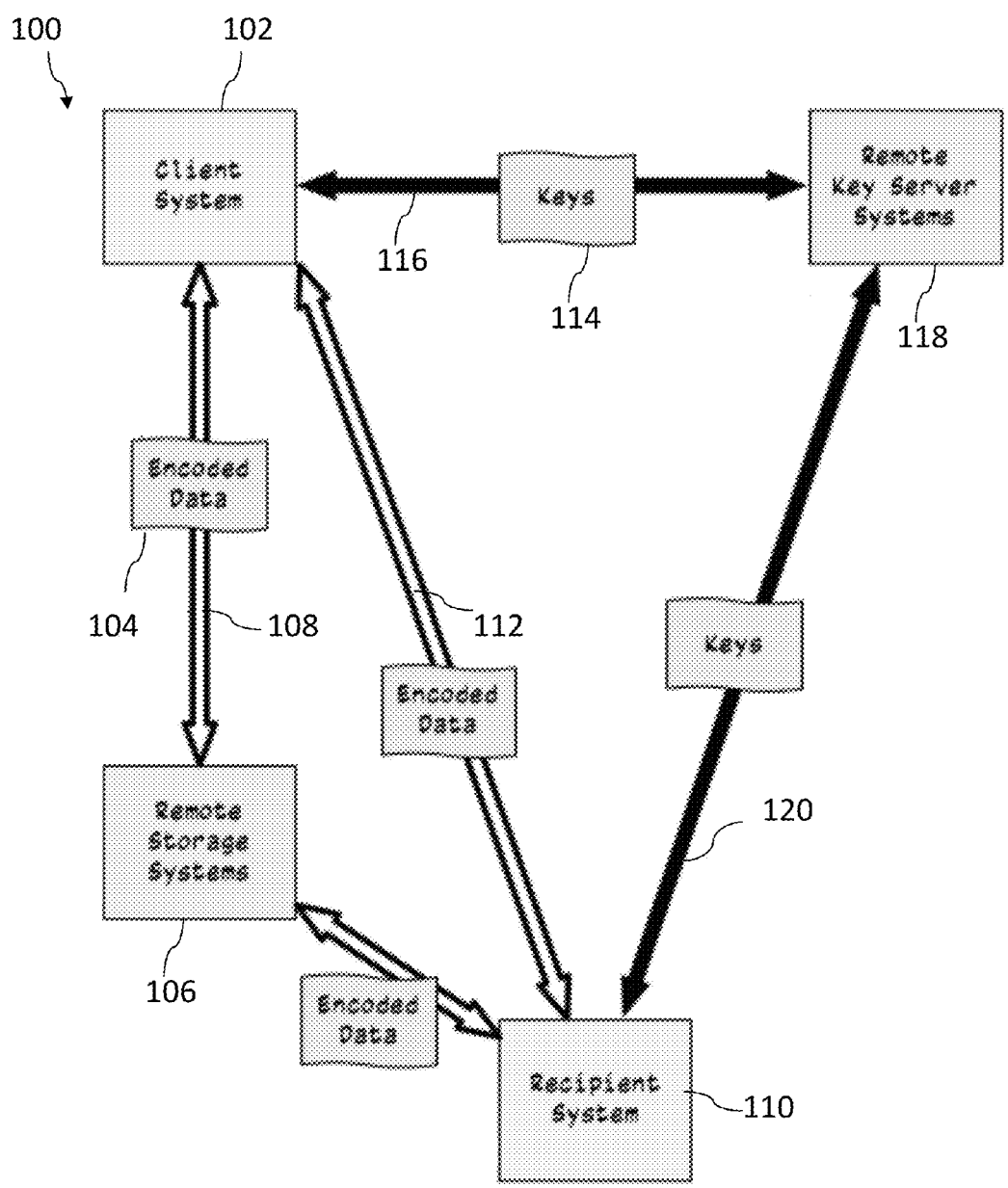
FIG. 1A is a block diagram of a system for transmitting encoded information in accordance with embodiments of the present invention.

FIG. 1A illustrates a system 100 in accordance with various embodiments of the present invention. A client system 102 may be used to store and process images, communicate over a computer network, execute computer instructions, and/or and present the resulting data to a user. The client system 102 may be a desktop computer, laptop computer, cellular phone, tablet computer, or any other similar device, and may include a computer processor, nonvolatile storage, volatile storage, a display, input devices such as a keyboard, mouse, or touchscreen, and may be used to execute an operating system and various software applications.

The client system 102 may be used to send and/or receive encoded data 104 to and/or from one or more remote storage system 106 via a computer network 108 (such as the Internet or private network). The client system 102 may further communicate with an intended recipient system 110, which, like the client system 102, may be any typical device. Communication between the client system 102 and the recipient system 110 may be over the same 108 or different 112 computer network, either directly or through intermediate computers or network devices. The client system 102 may generate decoding and/or decryption keys 114 that may communicated over a secure computer network 116 to a remote key-server system 118, which may be a client, server, or other device, and like the client 112 and recipient 110 system, may include a processor, memory, storage, etc. The recipient system 110 may obtains the decoding and decryption keys 114 over the same 116 or a different 120 secure computer network.

Figure 1B:
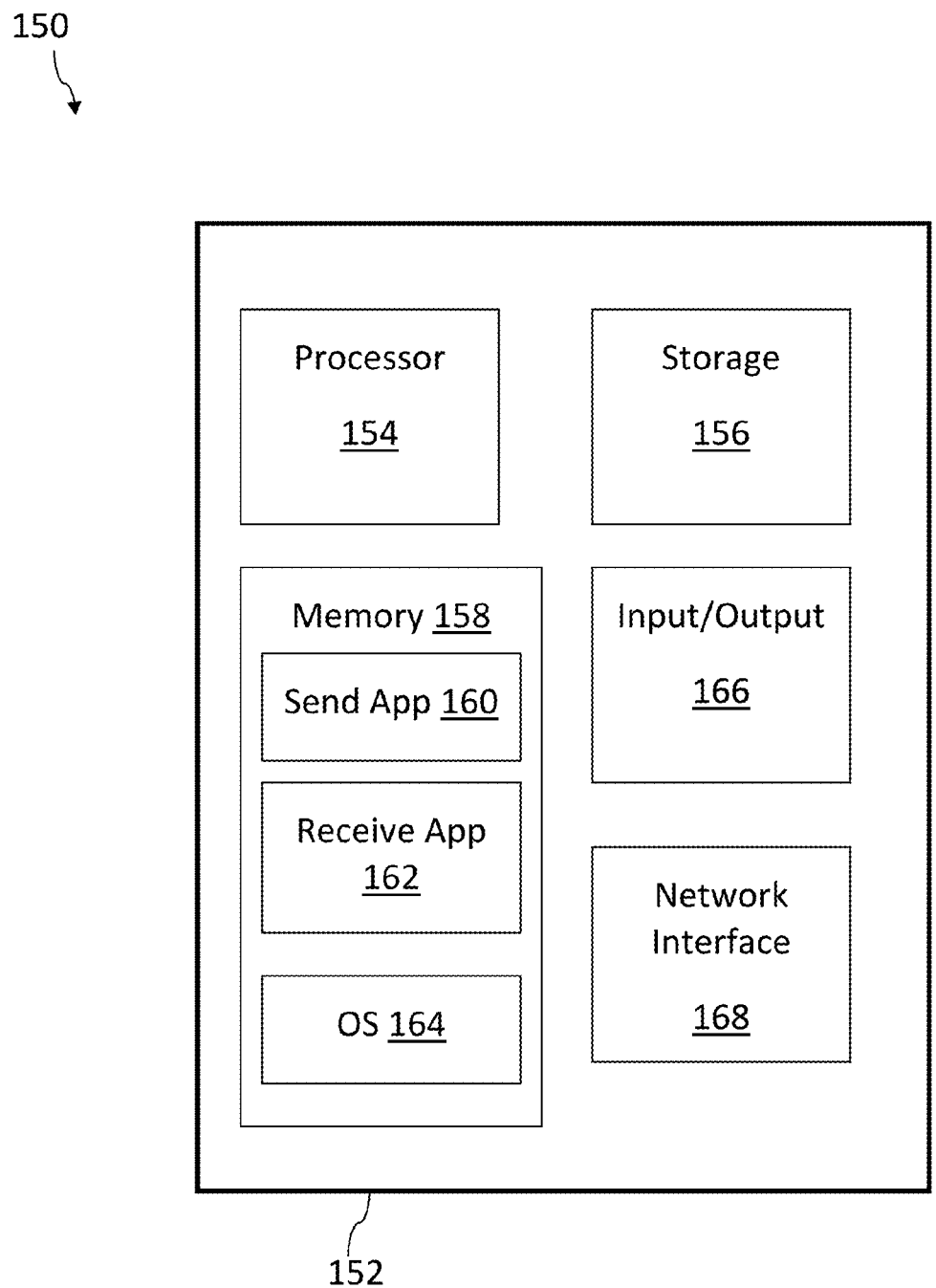
FIG. 1B is block diagram of an exemplary sender or receiver system.

FIG. 1B is a block diagram of an exemplary sender or recipient system 150. The system 150 includes a processor 154, non-volatile storage 156, a memory 158 (including a sender application 160 and/or a receiver application 162 and an operating system 164 for managing said applications); the memory 158 may load the applications and/or OS from the storage 156. The system 150 may further include input/output devices (such as a keyboard, mouse, touchscreen, or display) and a network interface 168.

Figure 2:
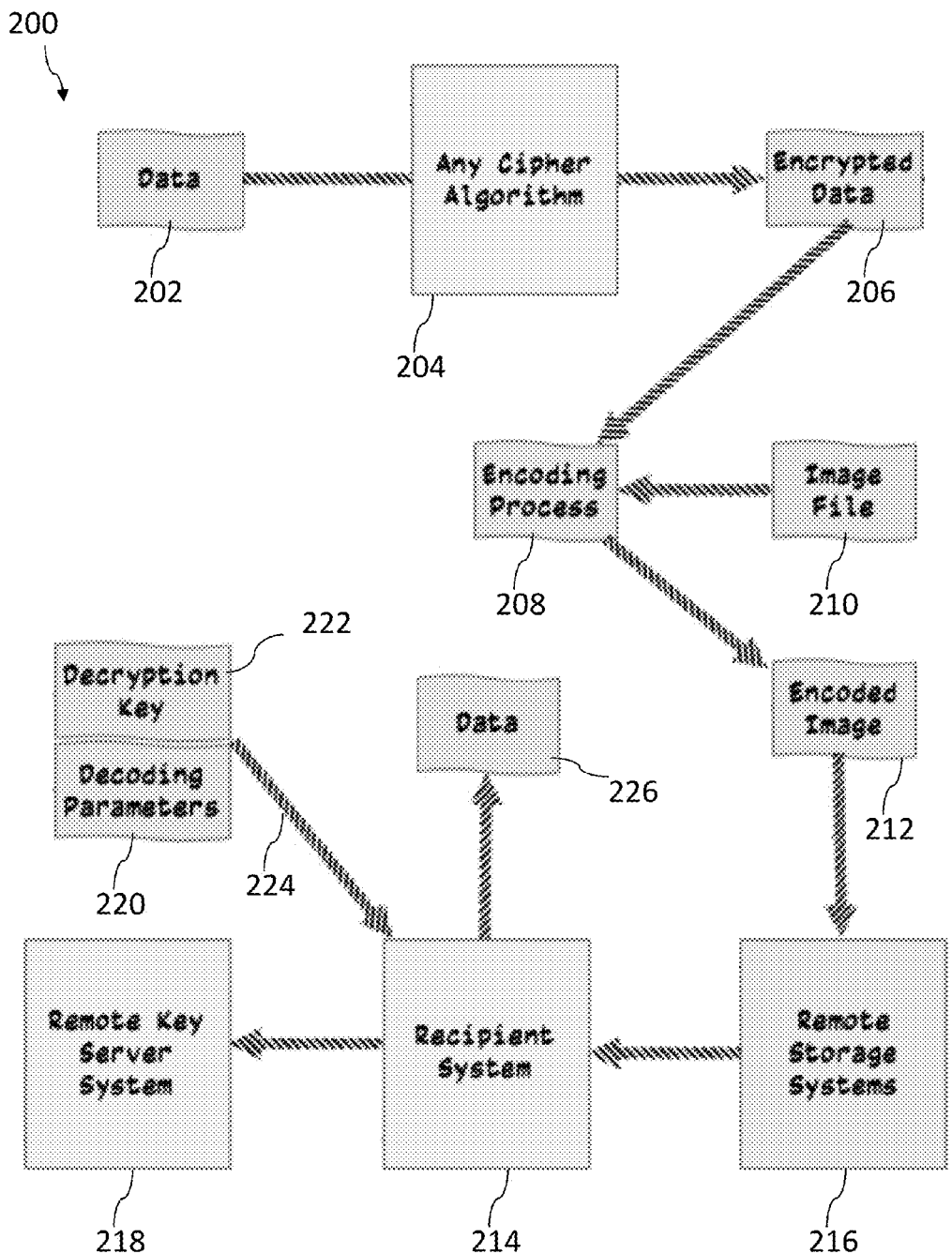
FIG. 2 is a block diagram of a method for transmitting encoded information in accordance with embodiments of the present invention.

FIG. 2 illustrates a method 200 for sending and/or receiving data in accordance with embodiments of the present invention. Data 202 may be encrypted using any means known in the art, such as by using a reliable cipher 204. The created encrypted data 206 may thereafter be encoded 208 within an image file 210 (or, in other embodiments, an audio, video, or any other file). The encoded image 212 may then be transmitted to a storage system 214 of a remote system 216 via any computer network, such as the Internet. The recipient system 214 may then authenticate the encoded image 212 by using, for example, a remote key-server system 218 and thereby obtain decoding parameters 220 and a decryption key 222 via an encrypted network connection 224 using, for example, SSL/TLS. The recipient system 214 may then decode and decrypt data 226 contained in the encoded image 212.

Figure 3:
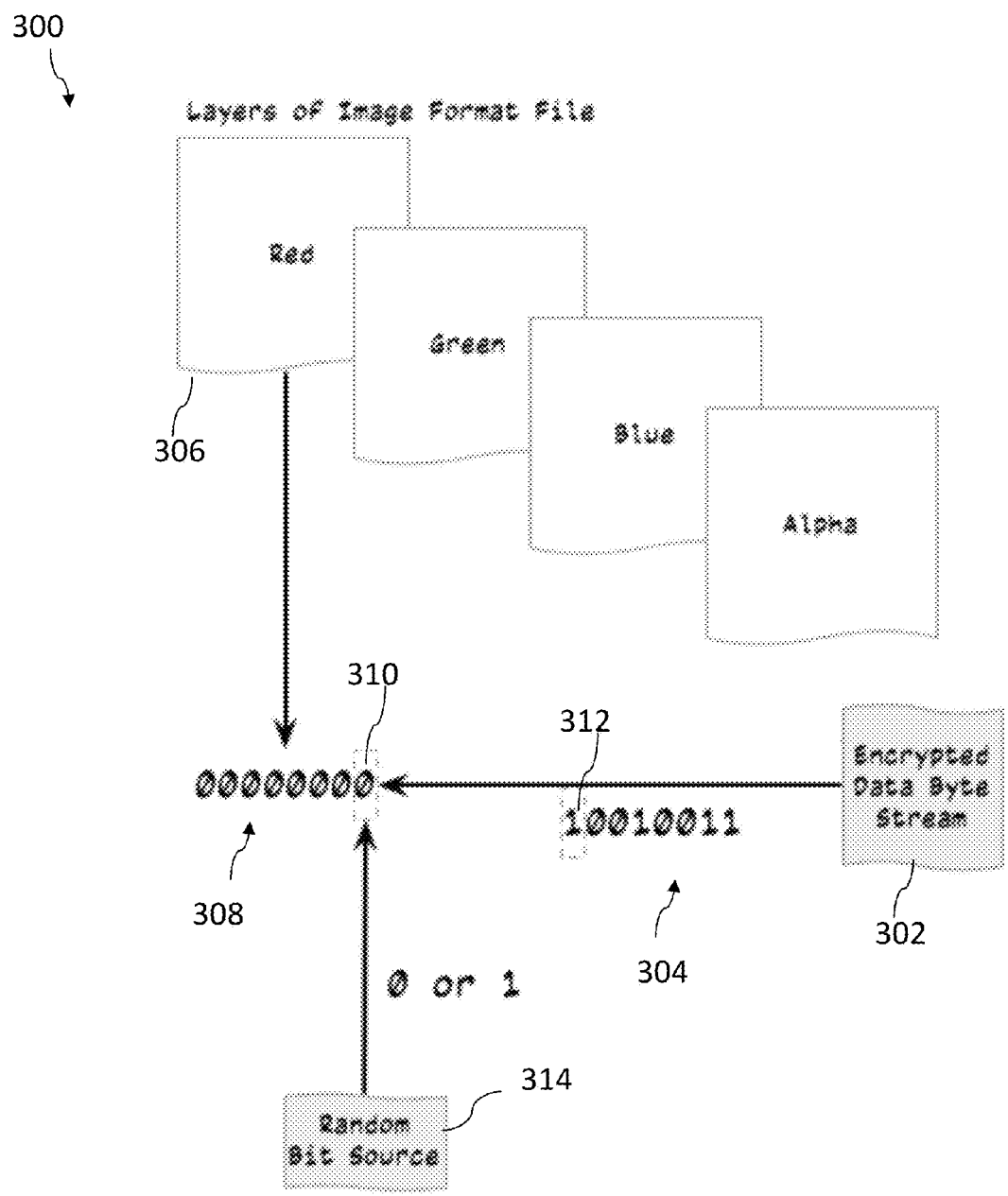
FIG. 3 is an illustration of encoding in accordance with embodiments of the present invention.

FIG. 3 illustrates one embodiment of an encoding process 300 suitable for the encoding described above with reference to FIG. 2. In one embodiment, each byte of encrypted data 302, starting with the left-most bit, is encoded, thereby forming a stream of bits 304 that are encoded into the low-order bits of pixels in an image-format file, such as a JPEG, PNG, TIFF, BMP, or other file. Starting with the first pixel in the image, and (in some embodiments) skipping pixels according to the pixel-skip method described below with reference to FIG. 4, each pixel is separated into layers, and the layers are ordered according to the method in FIG. 4. The selected bytes 308 in the selected layers are used for encoding by setting the low-order bit value 310 to the next bit of data 312 from the encrypted data stream 2302. If a pixel is not used for encoding (i.e., it is skipped), it is set to a random bit value (e.g., 0 or 1) generated by a random bit source 314.

Figure 4A:
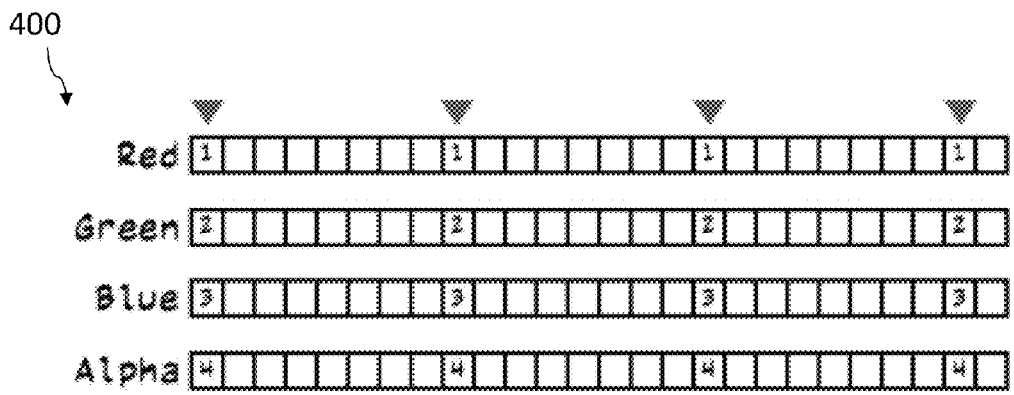
FIGS. 4A, 4B, and 4C are illustrations of pixel skipping in accordance with embodiments of the present invention.
Figure 4B:
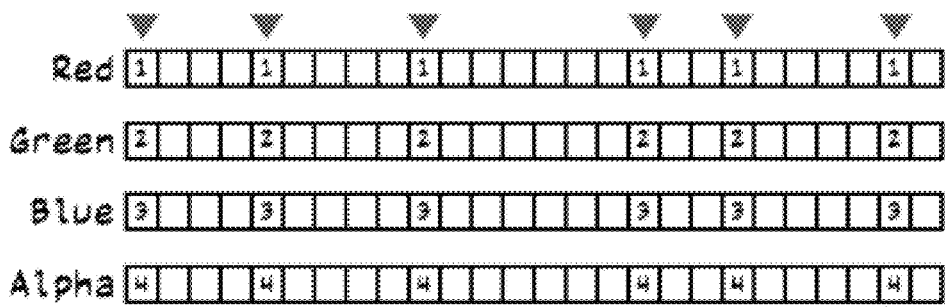
Figure 4C:
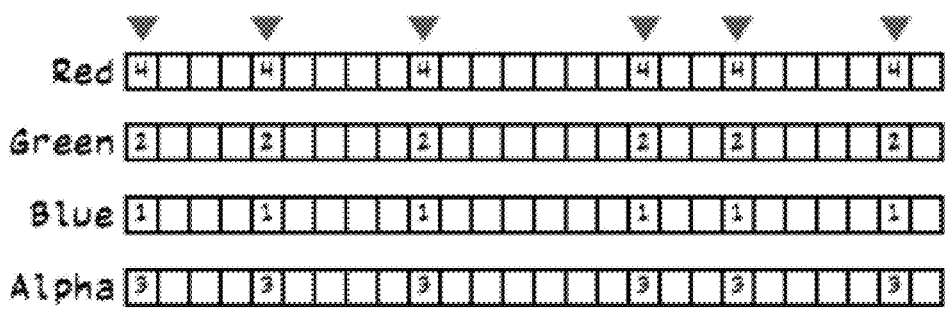
Figure 5:
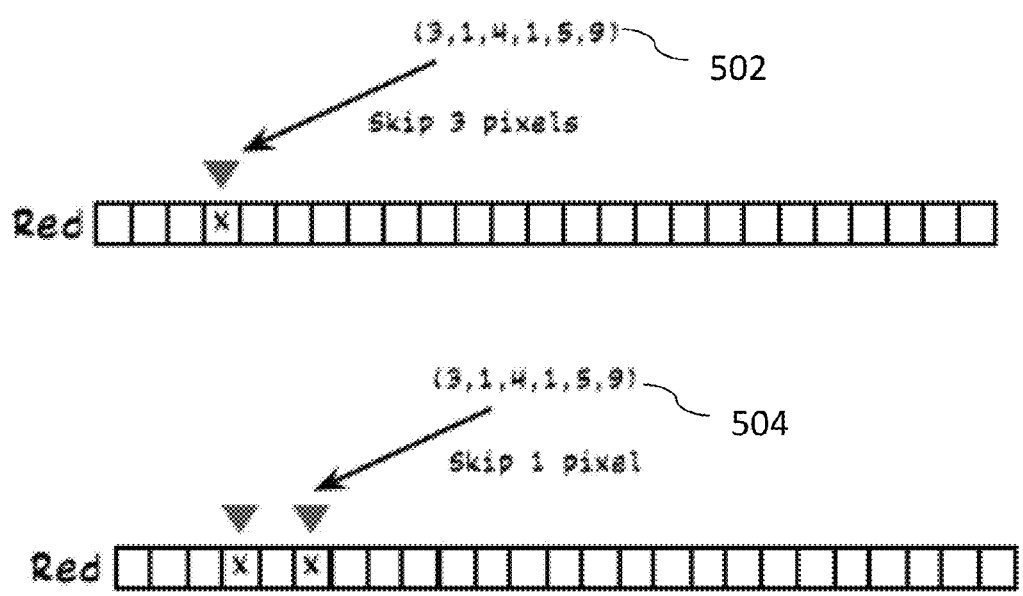
FIG. 5 is an illustration of randomization of unused pixel space in accordance with embodiments of the present invention.

The pixel-skip value, as shown in FIGS. 4A-C, may be set to a fixed value, as shown in FIG. 4A, as calculated based on the number of bits of data to be encoded divided into the number of bits of encoding capacity of the encapsulating data. Alternatively, it may be set to a random series of skips, as shown in FIG. 4B. In this embodiment, between one and four layers in the image (e.g. red, green, blue, and/or alpha layers) may be used. FIG. 4C illustrates that the layers may be permuted in any order, further increasing the available space for storing sensitive data and/or also increasing the difficulty of decoding. Random pixel skipping may be achieved by generating n random integers between 1-y on a client system (or via any other means known in the art) and by storing these integers on a remote computer. In this embodiment, n is a configurable value that may be adjusted to achieve higher randomness at the cost of a larger key; y is dynamically determined by looking at the pixel skip value computed in FIG. 4A to thereby ensure that space is available for encoding the encrypted data. These random integers may be used for the pixel-skip values during encoding 502, as shown in FIG. 5A; each pixel-skip value may be used once 504 until reaching the end of a list of random pixel-skip values, at which time the first random pixel-skip value may be used again.

Figure 6:
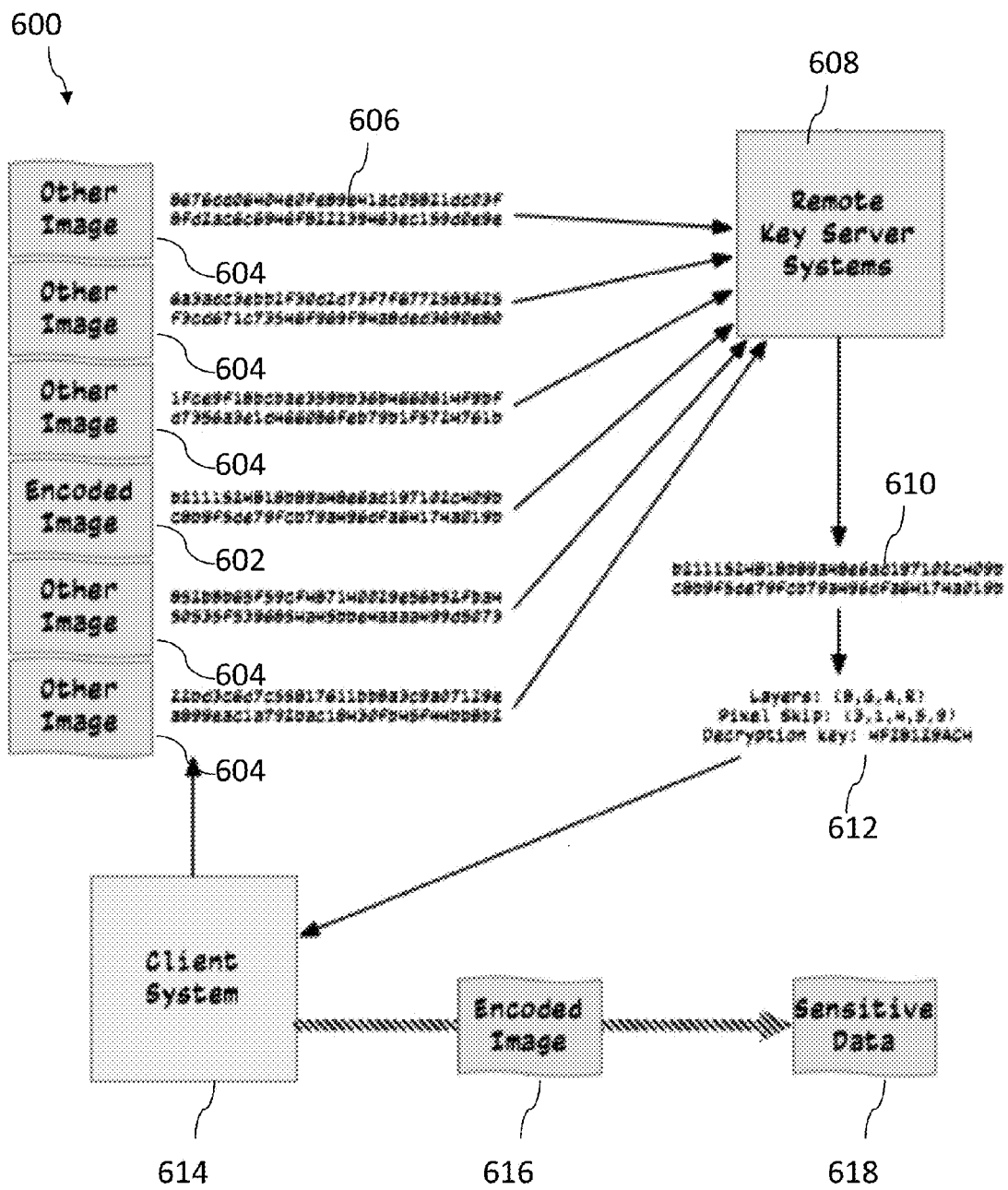
FIG. 6 is an illustration of associations between encrypted image files and decoding/decryption values in accordance with embodiments of the present invention.

FIG. 6 illustrates a block diagram 600 that shows how an encoded image file may be associated with decoding information. Each encoded image 602 is part of a set of one or more other images 604 that do not contain encoding. A hash 606 is computed using any reliable hash algorithm (e.g., a SHA-512/256 hash is shown, but any hash is within the scope of the present invention). The hashes 606 may be compared with a database of known images on the remote computer 608, and if a matching hash 610 is found, the decoding values (e.g., layers used, order of layers, and/or skip values) are returned along with the decryption key 612 over a network connection secured with encrypted communication, such as SSL/TLS (6G). The client computer 614 may then decode the image 616 and decrypt the original sensitive data 618. This method 600 may be used for encoding sensitive files within images, sending them over insecure networks that are being actively monitored, and delivering them to the recipient without anyone being aware that a message was sent or being able to decrypt it.

Figure 7:
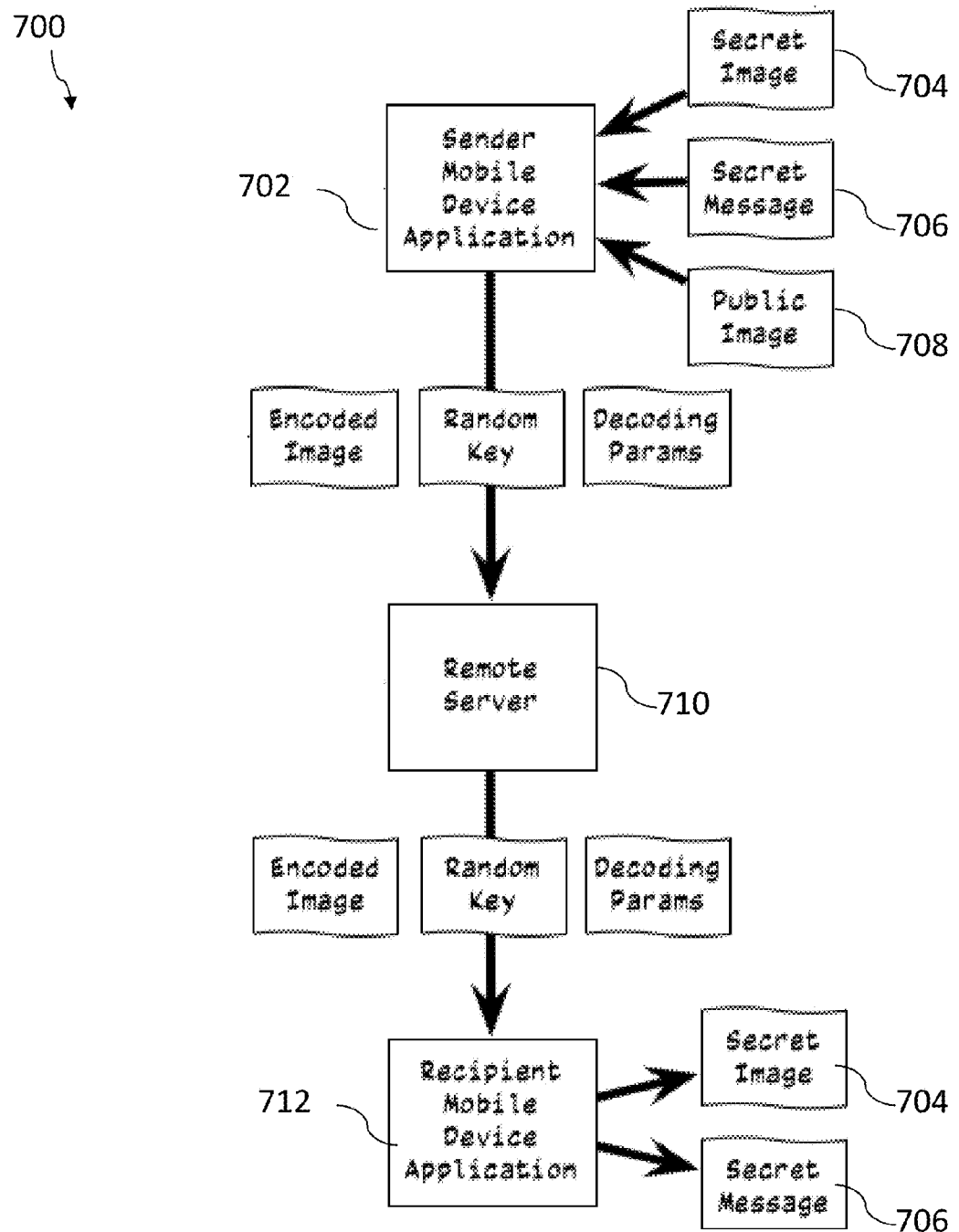
FIG. 7 is a block diagram of a system for transmitting encoded information in accordance with embodiments of the present invention.

In another embodiment of the present invention, symmetric keys are generated randomly for each message. FIG. 7 illustrates a system 700 in accordance with this embodiment. A sender mobile-device application 702 (executing on a cellular telephone, tablet computer, or other mobile device containing a processor, memory, storage, and input/output devices, as described above with the systems of FIG. 1A) stores locally or has network access to a secret image 704, a secret message 706, and a public image 708. The sender application 702 may generate a random encryption key, encrypt the secret image 704 and secret message 706 therewith, encode the resulting encrypted data into the public image 708, and transmit the encoded image, random key, and/or decoding parameters to a remote server 710. As described above, the decoding parameters may include the pixel-skip and layer ordering values used during encoding. In one embodiment, the generation, encryption, encoding, and transmission may occur as a result of a single action by a user of the sender application 702 (e.g., the clicking of a "send" button or widget).

After invoking the single operation to decrypt, the recipient mobile device application 712 requests the encoded image, key and decoding parameters 714 and the remote server 710 decides whether or not to provide them based on its own internal rules (e.g., if the remote device 712 passes an authentication check). The recipient device 712 uses them to decode and decrypt the image into the secret image 704 and secret message 706.

Figure 8:
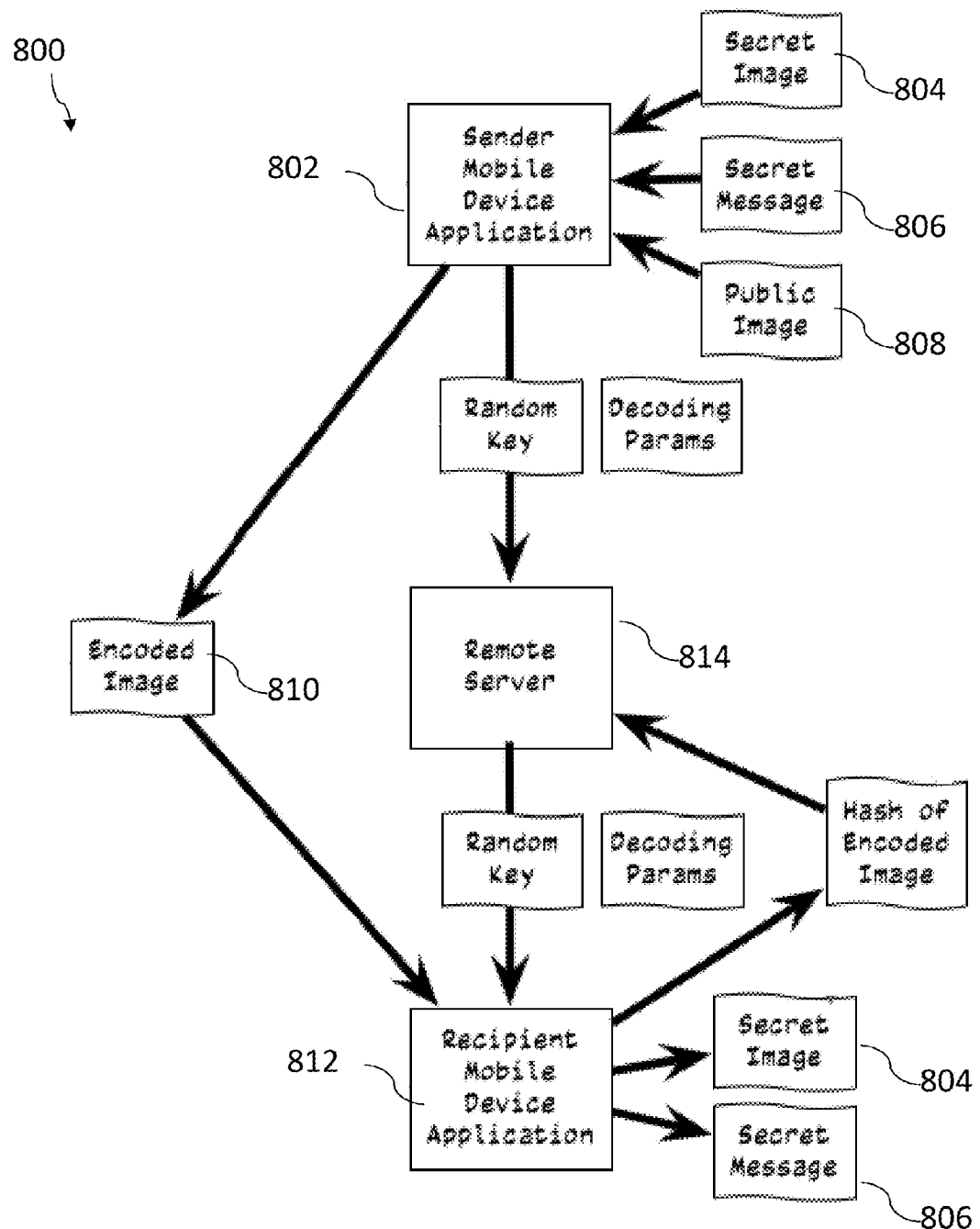
FIG. 8 is a block diagram of a method for transmitting encoded information in accordance with embodiments of the present invention.

Another embodiment 800 of the present invention is illustrated in FIG. 8. In this embodiment, the sender uses a mobile device application 802 having a secret image 804, secret message 806, and public image 808. The sender application 802 generates a random encryption key, encrypts the secret image and message, encodes the encrypted data into the public image 808, but only passes the random key and decoding parameters to the Remote Server (i.e., not the encoded image as in the embodiment of FIG. 7). The encoded image 810 is instead passed to the recipient mobile device application 812 via a separate channel, which in various embodiments is not secured. The encoded image 810 may be stored on intermediate servers or sent directly. The recipient mobile device application 812 computes a secure one-way hash of the encoded image data and provides this to the remote server 814, along with authentication. The remote server 814 decides to provide the key and decoding parameters, based on its own internal rules, to the recipient application 812. The recipient application 812 may use them to decode and then decrypt the image into the secret image 804 and secret message 806.

Figure 9:
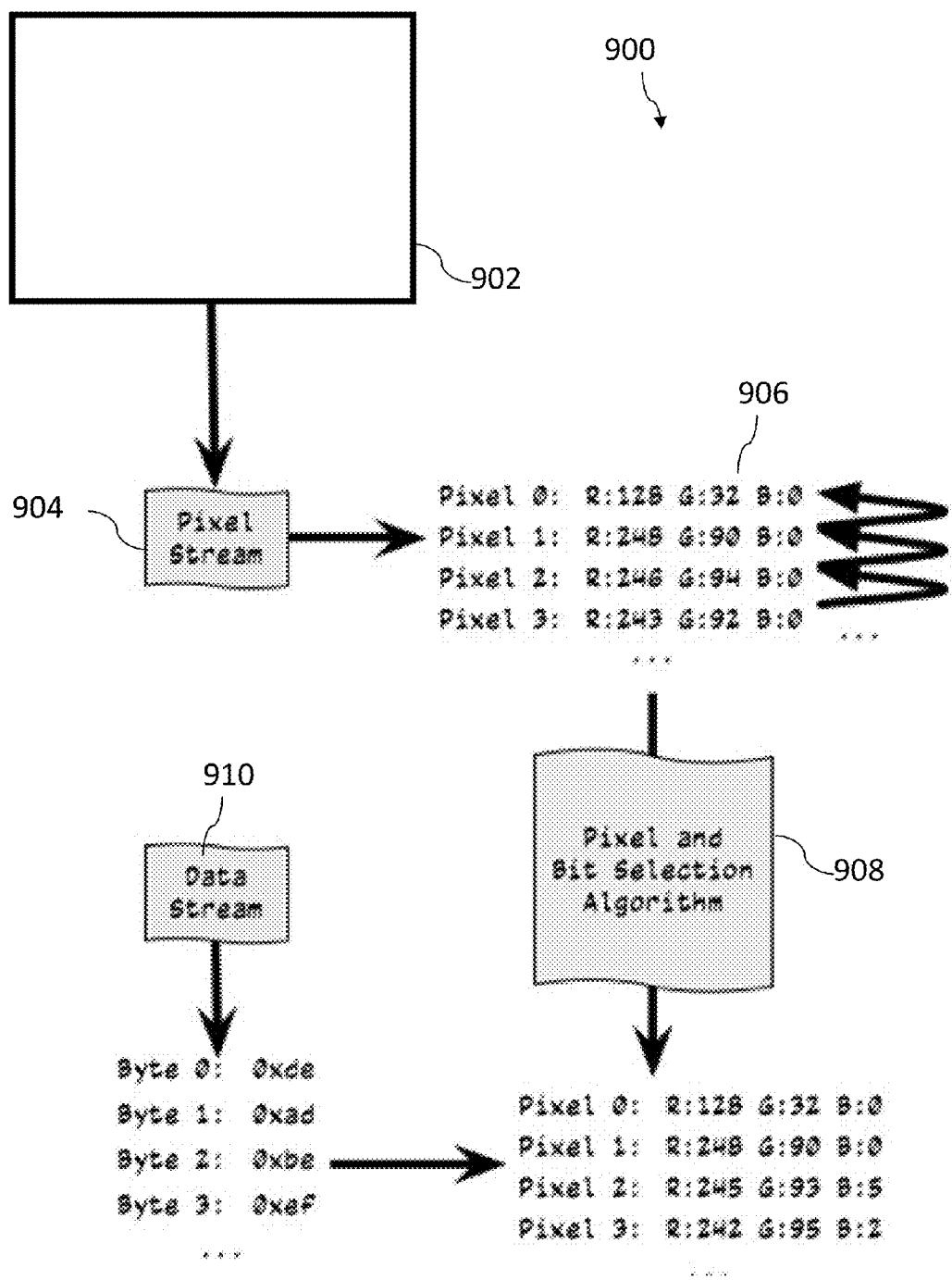
FIG. 9 is an illustration of variable encoding data into images.

In another embodiment of the present invention, as shown in the block diagram 900 in FIG. 9, entropy of an image is used to derive which and how many pixels are to be used for encoding. An unencoded image file 902 is used as the envelope for containing private data. The image file 902 is broken down into a stream of bytes 904 representing pixels in the image file 902, and the pixels are evaluated 906 in order. The red, green, blue, and/or alpha values are compared from one pixel to a previous pixel by a pixel-and-bit selection algorithm 908, which determines that if the difference between red, green, blue, and/or alpha values for two sequential pixels falls below a threshold, the pixels are selected for encoding. The threshold may be one, two, three, or any number of bits, and may be fixed at a bit value for all data or varied depending on the size of the data to be transmitted, for a desired security level, or based on a maximum permitted image distortion. A data stream 910 of private data is broken down into individual bytes, and each bit from each byte is encoded in the red, green, blue, and/or alpha values of the selected pixels using a variable number of LSBs.

Figure 10:
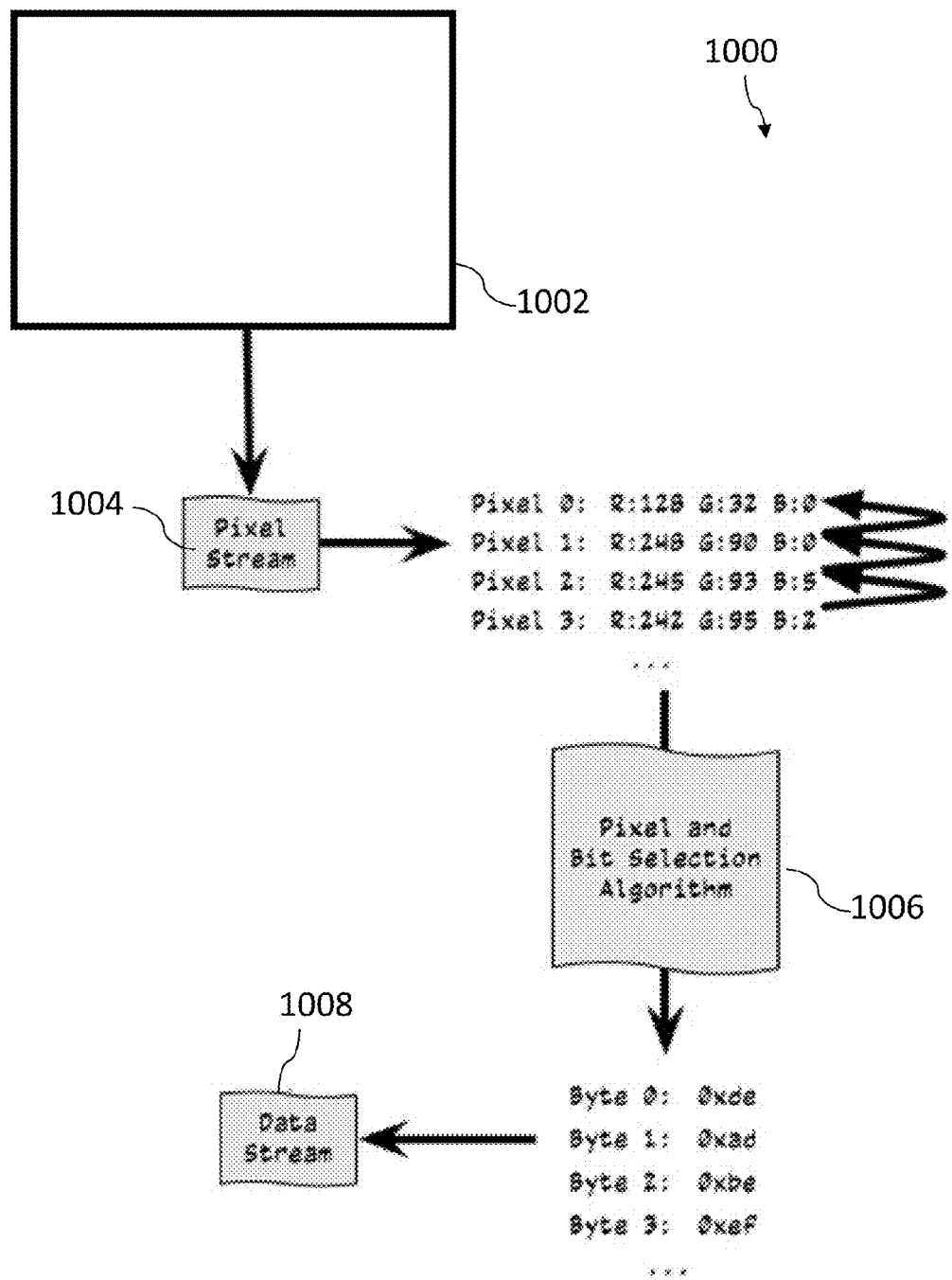
FIG. 10 is an illustration of decoding encrypted data from images.

FIG. 10 illustrates a corresponding decoding operation 1000 in accordance with an embodiment of the present invention. The encoded image file 1002 is broken down into a stream of bytes 1004, and the pixels are evaluated in order. Comparison against previous pixels is conducted according to the pixel and bit selection algorithm 1006, thereby allowing reconstitution of the encrypted data stream 1008.

Figure 11:
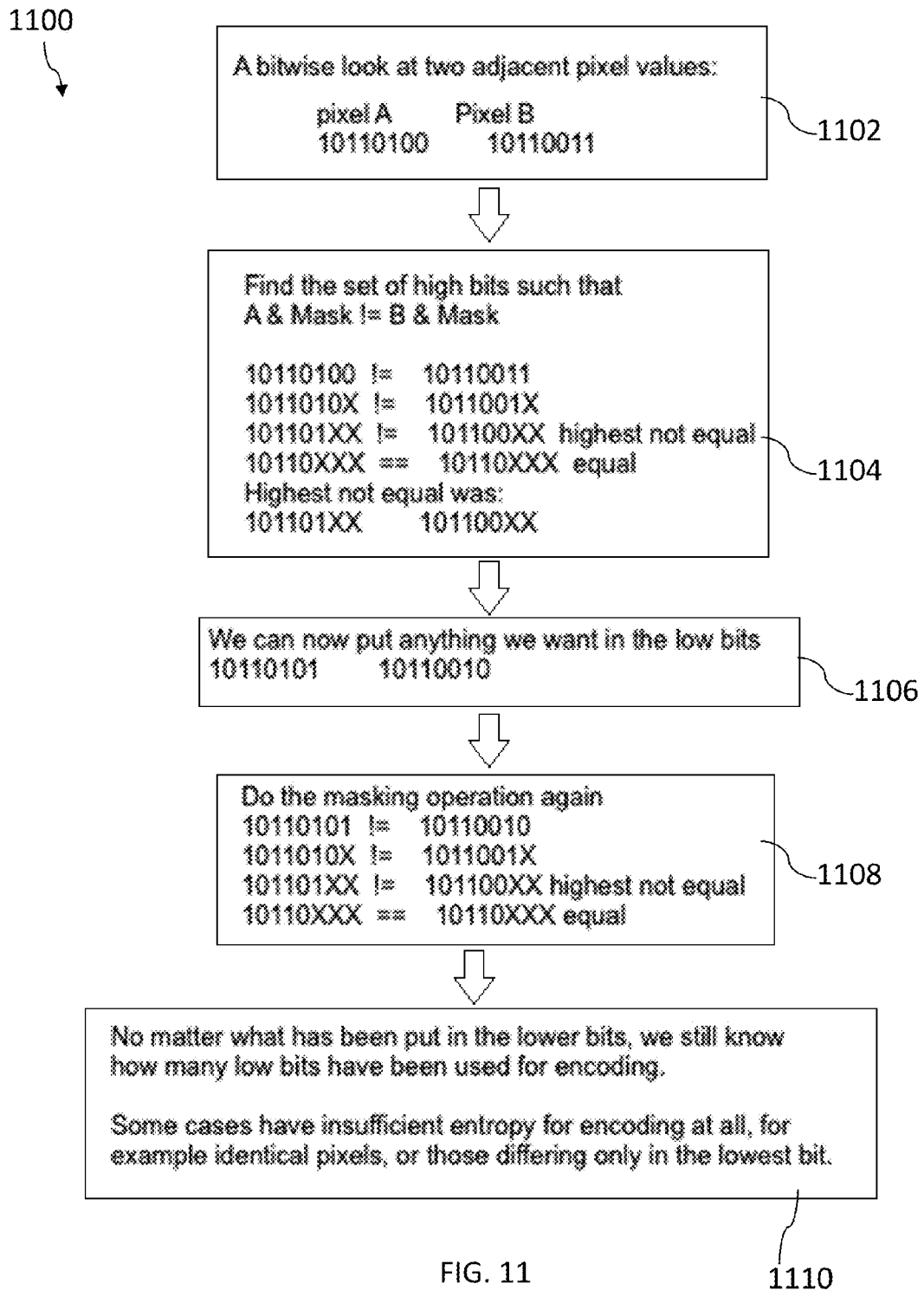
FIG. 11 is a block diagram of a method for pixel and bit selection in accordance with embodiments of the present invention.

FIG. 11 illustrates steps in an encoding algorithm suitable for use with the systems described above. In a first step 1102, the bits of two adjacent pixels are examined. In a second step 1104, the highest (i.e., most significant) non-matching bit shared between the two pixels is found (it is likely, because the two pixels are adjacent, that their values are similar and at least some of their highest-order bits are the same values). Once the highest-order matching bits and the highest-order non-matching bits are found, any data may be placed in the lower-order bits (step 1106). The highest-order non-matching bit is retained and not used for placing data in the bit to act as a "marker" in decoding; in other words, a decoding system may similarly look for the highest-order non-matching bit (step 1108) and know that everything lower may be data (step 1110).

The embodiments described above improve on existing systems and methods in a number of ways. For example, an improvement in data security over simple data encryption is provided. If the difficulty of breaking a given encryption system E is the value Et, for example, and the difficulty of checking an image for encoded data is D with time value Dt, then embodiments of the present invention increase the time to decrypt to $Et+2.4\times10^{}4$ Dt up to $Et+2.4\times10^{}24$ Dt.

Further, another improvement over current systems of sending encrypted data is provided: the sender and recipient may exchange encrypted data without observers being aware that encrypted data is being sent. Current computer networks are constantly monitored by, for example, governments and criminal organizations. Sending encrypted data is unusual enough that it may trigger suspicion solely for having sent or received it. In some countries, sending encrypted data is against the law. Embodiments of the present invention allow a sender to send encrypted data in a simple image that is part of a larger set of images, without raising suspicion. The recipient who receives it also does not raise suspicion by opening an image from a larger set of images.

In addition, an improvement in storage capacity is provided. Because the variable encoding described herein takes advantage of entropy in the container image, embodiments of the present invention encode more data per pixel than previous methods that use fixed numbers of bits per pixel for data storage. Also, embodiments of the present invention make it much more difficult to detect the presence of encoded data within photographic image files using current state-of-the-art methods.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for encoding and transmitting electronic information, the method comprising:
    comparing values, using a computer processor, of adjacent pixels in an electronic image;
    determining an amount of entropy present in values of adjacent pixels;
    identifying a highest-order non-matching bit in the values of adjacent pixels;
    replacing bits of lower order than the highest-order non-matching bit with data;
    storing the image and replaced bits in a computer memory; and
    transmitting the image and replaced bits, via a computer network, to a recipient.

2. The method of claim 1, further comprising:
    receiving the image and replaced bits with a recipient system;
    identifying the highest-order non-matching bit in values of adjacent pixels; and
    extracting data from bits of lower order than the highest-order non-matching bit.

3. The method of claim 1, wherein the values of adjacent pixels comprise red, green, blue, or alpha values.

4. The method of claim 1, further comprising comparing the amount of entropy to a threshold and replacing bits only if the amount of entropy is greater than a threshold.

5. The method of claim 1, further comprising encrypting the data prior to replacing bits with the data.

6. The method of claim 1, wherein the amount of entropy varies across multiple pixels and varying numbers of lower-order bits are replaced accordingly.

7. The method of claim 1, further comprising transmitting a random key and decoding parameters to a recipient.

8. The method of claim 1, further comprising transmitting the image and replaced bits via a remote server or transmitting the image and replaced bits directly to a recipient.

9. The method of claim 1, further comprising generating decoding or decryption keys and transmitting said keys to a remote key-server system via a secure computer network.

10. A system for encoding and transmitting information, the system comprising:
    a computer memory configured for storing an electronic image;
    a computer processor configured for executing computer instructions for:
        i. comparing values of adjacent pixels in the image;
        ii. determining an amount of entropy present in values of adjacent pixels;
        iii. identifying a highest-order non-matching bit in the values of adjacent pixels;
        iv. replacing bits of lower order than the highest-order non-matching bit with data;
        v. storing the image and replaced bits in the computer memory; and
        vi. transmitting the image and replaced bits, via a computer network, to a recipient.

11. The system of claim 10, further comprising a recipient system comprising a computer processor configured for executing computer instructions for:
    receiving the image and replaced bits;
    identifying the highest-order non-matching bit in values of adjacent pixels; and
    extracting data from bits of lower order than the highest-order non-matching bit.

12. The system of claim 10, further comprising a remote key-server system for receiving, via a secure computer network, decoding or decryption keys and generated by the system.

13. The system of claim 10, further comprising non-volatile storage for storing the computer instructions or image.

14. The system of claim 10, wherein the values of adjacent pixels comprise red, green, blue, or alpha values.

15. The system of claim 10, wherein the computer processor is further configured for executing computer instructions for encrypting the data prior to replacing bits with the data.

16. The system of claim 10, wherein the computer processor is further configured for executing computer instructions for varying numbers of lower-order bits are replaced accordingly in accordance with the amount of entropy varies across multiple pixels.

17. The system of claim 10, wherein the computer processor is further configured for executing computer instructions for generating decoding or decryption keys and transmitting said keys to a remote key-server system via a secure computer network.

\* \* \* \* \*